United States Patent
Reinhardt et al.

(10) Patent No.: US 6,281,904 B1
(45) Date of Patent: Aug. 28, 2001

(54) MULTI-SOURCE TEXTURE RECONSTRUCTION AND FUSION

(75) Inventors: Tilman Reinhardt, Woodside; Robert Seidl, Portola Valley, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/094,078

(22) Filed: Jun. 9, 1998

(51) Int. Cl.$^7$ .................................................. G06T 7/40

(52) U.S. Cl. .................... 345/430; 345/429; 345/435; 345/431

(58) Field of Search .................................... 345/430, 431, 345/429, 426, 435, 113, 115, 114

(56) References Cited

U.S. PATENT DOCUMENTS

| | | | |
|---|---|---|---|
| 4,969,036 | 11/1990 | Bhanu et al. | 358/105 |
| 5,550,960 | * 8/1996 | Shirman et al. | 395/130 |
| 5,611,027 | * 3/1997 | Edgar | 395/131 |
| 5,699,444 | * 12/1997 | Palm | 382/106 |
| 5,850,352 | * 12/1998 | Moezzi et al. | 364/514 |
| 6,009,190 | * 12/1999 | Szelski et al. | 382/154 |
| 6,016,150 | * 1/2000 | Lengyel et al. | 345/426 |
| 6,043,821 | * 3/2000 | Sprague et al. | 345/430 |

OTHER PUBLICATIONS

Paul E. Debevec et al., "Modeling and Rendering Archetecture from Photographs: A hybrid geometry– and image–based approach", University of California at Berkeley, pp. 1–33 (Jan. 19, 1996).

Michael Gleicher and Andrew Witkin, "Through–the–Lens Camera Control", Carnegie Mellon University Pittsburgh, PA, pp. 331–340 (1992).

Michael Kass, "Condor: Constraint–Based Dataflow", *Computer Graphics*, vol. 26, No. 2, pp. 321–330 (Jul. 1992).

Robert M. Haralick and Linda G. Shapiro, "Computer and Robot Vision", pp. 116–151.

Paul S. Heckbert, "Fundamentals of Texture Mapping and Image Warping", *Computer Science Division University of California Berkeley*, pp. 1–87 (Jun. 1989).

(List continued on next page.)

*Primary Examiner*—Matthew Luu
*Assistant Examiner*—Daniel J Chung
(74) *Attorney, Agent, or Firm*—Blakely Sokoloff Taylor & Zafman LLP

(57) ABSTRACT

Information extracted from two or more images of a scene is composited into a single texture image for each surface of a computer-generated model of the scene thus providing, view-independent rectangular textures over standard geometries. In conjunction with a photogrammetric modeling system, the texture information may be extracted from a variety of images, which may be taken from a variety of different angles, with different cameras and under different lighting conditions. The fusion of the texture information is preferably performed during a preprocessing step, eliminating the need for further texture processing. Perspective projection artifacts in the final texture is reduced or eliminated. Further, visible seams between partial textures from different images (which may otherwise be caused by misregistration or differences in illumination) are reduced or avoided. The method uses the "best" available source information from each image, where "best" usually means highest resolution, but in practice a variety of measures can be used. Further, lighting information present in the source images can be extracted and eliminated to start with an "unlit" or "evenly lit" scene which can then be re-lit synthetically with different lights. Similarly, the true lighting information from the original images can be extracted and applied to unlit synthetic textures, thus simulating the actual lighting conditions without the need to model the lighting virtually. Given enough images of the same surface, view-dependent obstructions which may partially obscure the surface in various views can be automatically removed.

32 Claims, 8 Drawing Sheets

OTHER PUBLICATIONS

Tzay T. Young, "Handbook of Pattern Recognitin and Image Processing: Computer Vision", vol. 2, pp. 1–5.

J. M. Ogden et al., "Pyramid–Based Computer Graphics", RCA Corp., Reprint RE–30–5–1, pp. 4–15, (Sep./Oct. 1985).

Jeremy S. De Bonet, "Multisolution Sampling Procedure for Analysis and Synthesis of Texture Images", Computer Graphics Proceedings, Annual Conference Series, pp. 361–368, (Aug. 3–8, 1997).

Camillo J. Taylor & David J. Kriegman, "Minizaton on The Lie Group SO(3) and Related Manifolds", Yale University, Technical Report No.: 9405, pp. 1–8, (Apro. 1994).

B. Vijayakumar et al., "Structure and Motion of Curved 3D Objects from Monocular Silhouettes", Dept. of Electrical Engineering Yale University & Computer Science University of Illinois, pp. 1–8 (1996).

Camilo J. Taylor & David J. Kriegman, "Structure and Motion From Line Segnants In Multiple Images", Dept. of Electrical Engineering Yale University, pp. 1–31.

Shenchang Eric Chen & Lance Williams, "View Interpolation for Image Synthesis", *Apple Computers, Inc.*, pp. 279–288 (1993).

Youichi Horry et al., "Tour Into the Picture: Using a Spidery Mesh Interface to Make Animation from a Single Image", Computer Graphics Proceedings, Annual Conference Series, pp. 225–232 (1997).

Richard Szeliski and Heung–Yeung Shum, "Creating Full View Panoramic Image Mosaics and Environment Maps", *Siggraph*, pp. 251–258 (Aug. 3–8, 1997).

Steven M. Seitz and Charles R. Dyer, "View Morphing", Computer Graphics Proceedings, Annual Conference Series, pp. 21–30 (1996).

Marc Levoy and Pat Hanrahan, "Light Field Rendering", Computer Graphics Proceedings, Annual Conference Series, pp. 31–42 (1996).

Steven J. Gortler et al., "The Lumigraph", Computer Graphics Proceedings, Annual Conference Series, pp. 43–54 (1996).

James D. Foley et al., "Computer Graphics: Principles and Practice", Addison–Wesley Publishing Company, Second Edition pp. 603–647 (1987).

* cited by examiner

MULTI-SOURCE TEXTURE RECONSTRUCTION AND FUSION

FIELD OF THE INVENTION

The present invention relates to methods for mapping textures onto synthetically rendered three-dimensional objects and, in particular, to the creation and utilization of merged, view-independent textures from multiple views for application in computer-assisted three-dimensional modeling routines.

BACKGROUND

Three-dimensional modeling, which is now a subset of the larger field of computer graphics, has become popular in a number of areas, for example, as applied in computer-aided design of architecture, industrial design and construction. As has been recognized in these and other fields, it is often desirable to have a three-dimensional model, complete with a description of shape, location, orientation and material surface properties (i.e., texture), in order to produce realistic renderings on a computer which can be used to document a new design of a city, a building or an object. The model can also be used for computer animations, virtual reality immersion of users in a scene or for manufacturing tasks.

Producing an image of a three-dimensional scene requires finding the projection of that scene and re-projecting it onto a two-dimensional screen. If the image of the three-dimensional scene is to appear realistic, then the projection from three to two dimensions must be a perspective projection. In the case of a scene which includes texture mapped surfaces, this involves not only determining where the projected points of the surfaces should appear on the screen, but also which portions of the texture image should be associated with the projected points. The process of mapping surface textures onto a synthetically rendered three-dimensional object is one which is well known in the computer graphics art. See, e.g., Foley et al., *Computer Graphics Principles and Practices*, Second Edition, § 17.4, 1990. Such texture mapping allows objects rendered by the computer system to appear realistic, without the need for highly detailed geometric modeling. Typically, a complex scene is converted to polygons before projection, and modem graphics systems, both hardware and software, are capable of rendering rectangular textures onto a variety of geometric primitives including polygons, spheres, boxes, etc.

Some practitioners have proposed using view-dependent textures. In such schemes, a three-dimensional model is rendered from a particular point of view and a decision is made as to which of several available source textures will be used for the rendering. Unfortunately, such schemes rely on the use of individual textures taken from images of different points of view and these individual images may have large regions which are "wrong" or "obscured" (depending on the particular projection of the model of the scene being displayed). Thus, the schemes resort to some kind of hole-filling technique which often results in visual artifacts. Moreover, because the multiple textures are unrelated, the final texture on a surface during an animation can appear to "pop" when different source textures are switched on. For example, a tree may suddenly appear and/or disappear or an entire surface may change in hue or luminosity. This popping effect can be reduced somewhat by blending rather than just switching textures, however, real time blending is not supported by many computer graphics systems. Preparing the blended versions in a preprocessing step is impractical because of the many possible viewing angles and thus many possible blended versions. The memory requirements for such a scheme would be large and, effectively, cost prohibitive. Further, sending down new textures (i.e., new blended textures) for every few frames of the animation would likely overload the graphics pipeline of the computer system. See, e.g., Eric Chen, "View Interpolation for Image Synthesis", Computer Graphics, *Proceedings, SIGGRAPH* 1993, pp. 279–288 (1993); Marc Levoy and Pat Hanrahan, "Light Field Rendering", Computer Graphics, *Proceedings, SIGGRAPH* 1996, pp. 31–42 (1996); and Steven Gortler et al., "The Lumigraph", Computer Graphics, *Proceedings, SIGGRAPH* 1996, pp. 43–54 (1996).

A recently published method (Paul Debevec et al., "Modeling and Rendering Architecture from Photographs: A Hybrid Geometry- and Image-Based Approach", *University of California Berkeley Technical Report UCB-CSD*-96-893, January 1996) proposes a somewhat different scheme. The method requires a user to first create a parameterized (or rough) model of the objects in the scene using a separate editor. Second, the user draws edges on top of one or more photographs. Third, the user marks each edge in each photograph as corresponding to a particular edge in the parameterized model. The method then calculates values for the parameters in the model. For the texturing, dense depth information is extracted for a surface and that depth is used to render a 2½-dimensional version of the surface. This requires a preprocessing step for extracting the depth information but can result in more realistic renderings than are available using the above methods. This work is based in part on concepts and mathematics from Camillo Taylor and David Kriegman of Yale University, as reported in "Structure and Motion from Line Segments in Multiple Images", *Yale University Technical Report*#94026, January 1994. However, because the depth information is used inside the texture/surface rendering loop of the modeling algorithm, the method cannot be used with standard graphics systems which generally do not allow a user to modify these inner loops. This limits the wide applicability of the texture plus depth rendering process.

In light of the need for computer-generated three-dimensional models, but given the shortcoming of prior schemes for texture mapping, it would be desirable to have an improved computer-assisted technique for the creation and utilization of merged, view-independent textures from multiple views for application in interactive, computer-assisted three-dimensional modeling routines.

SUMMARY AND OBJECTIVES OF THE INVENTION

Thus, one object of the present invention is to provide an improved computer-assisted technique for creation and utilization of merged, view-independent textures from multiple views, e.g., for application in interactive environments.

In one embodiment, the present invention provides such a solution in a method which allows for fusing information extracted from two or more images of a scene into a single texture image for each surface of a computer-generated model of the scene. One benefit of this method is that its output comprises standard, view-independent rectangular textures over standard geometry, which allows the method to be used by a wide variety of existing hardware and software computer graphics display systems. In conjunction with a photogrammetric modeling system, the textures are extracted from a variety of images, which could have been taken from a variety of different angles, with different cameras and under different lighting conditions. The fusion of the texture information is preferably performed during a preprocessing step, eliminating the need for further texture processing.

In order to produce realistic output textures, the present method seeks to eliminate perspective projection artifacts in the final textures. Further, visible seams between partial textures from different images (which may be caused by misregistration or differences in illumination) are reduced or avoided. At the same time, the method uses the "best" available source information from each image, where "best" usually means highest resolution, but in practice a variety of measures can be used.

An additional benefit of the present method is that lighting information present in the source images can be extracted and eliminated to start with an "unlit" or "evenly lit" scene which can then be re-lit synthetically with different lights. Similarly, the true lighting information from the original images can be extracted and applied to unlit synthetic textures, thus simulating the actual lighting conditions without the need to model the lighting virtually.

A further benefit provided by the present invention is that given enough images of the same surface, view-dependent obstructions which may partially obscure the surface in various views (e.g., trees, lampposts, or moving objects such as birds or automobiles), can be automatically removed, eliminating the need for any retouching of the image.

By way of example, in one embodiment, the present invention provides a method which includes fusing information extracted from two or more images of a scene into a texture image for a surface of a computer-generated model of the scene. In general, the two or more images may each include different views of the scene and each may be taken with a different cameras under different lighting conditions. The fusing process makes use of the best available source information from each image, where the "best" information from each image typically comprises the highest resolution image available.

Before the fusing process itself, each of the two or more images of the scene may be sorted according to a metric. The metric is, in general, a measure of the "goodness" of each image for a corresponding surface of the three-dimensional model and is established on the basis of one or more of: resolution, validity, obliqueness, and off-centeredness of each image. Alternatively, the images may be sorted by resolution alone.

After sorting the images, the method preferably corrects perspective distortions in the images. Then, for each of the images and for each surface in each of the respective images, a determination is made as to whether a particular pixel is a visible part of each respective surface, after accounting for perspective distortions in the images. Based on this determination, a validity mask for each image is produced and stored as a v-channel.

The v-channels may be eroded, e.g., using a continues ramp function to allow for image smoothing. Then the fusing process may occur by copying the color and v-channel information of the best of the images into a working buffer and, for each of the remaining images, copy into the working buffer that color and v-channel information associated therewith for which the v-channel information in the working buffer is still zero. In an alternative embodiment, which allows a high quality composite texture map to be produced, the fusing process comprises blending color information from the images according to v-channel information therefor. Other objects, features and advantages of the present invention will be apparent from the accompanying drawings and the detailed description which follows.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The present invention is illustrated by way of example and not limitation in the figures of the accompanying drawings in which.

DETAILED DESCRIPTION

Described herein is a computer-assisted technique for creating and/or utilizing merged, view-independent textures from multiple views, e.g., for application in interactive computer-assisted modeling environments. The technique is especially useful in image assisted modeling applications wherein a three-dimensional model is constructed on top of one or more images such that the model's parameters automatically match those of objects depicted in the images. Before describing further details of these texture mapping techniques, however, it may be helpful to provide a brief description of the relevant components of an exemplary computing environment within which the present invention may find application. Afterwards, a brief description of a method of modeling a scene depicted in an image is presented. More complete discussions of these methods may be found in co-pending application Ser. No. 09/062512, entitled "Method and Apparatus for Image Assisted Modeling of Three-Dimensional Scenes" filed Apr. 17, 1988, and in co-pending application Ser. No. 09/076366, entitled "Parameter Selection for Approximate Solutions to Photogrammetric Problems in Interactive Applications" filed May 11, 1988, each by Tilman Reinhardt and Robert Seidl and each assigned to the Assignee of the present application. Both of these references are incorporated herein by reference in their entireties.

Figure 1:
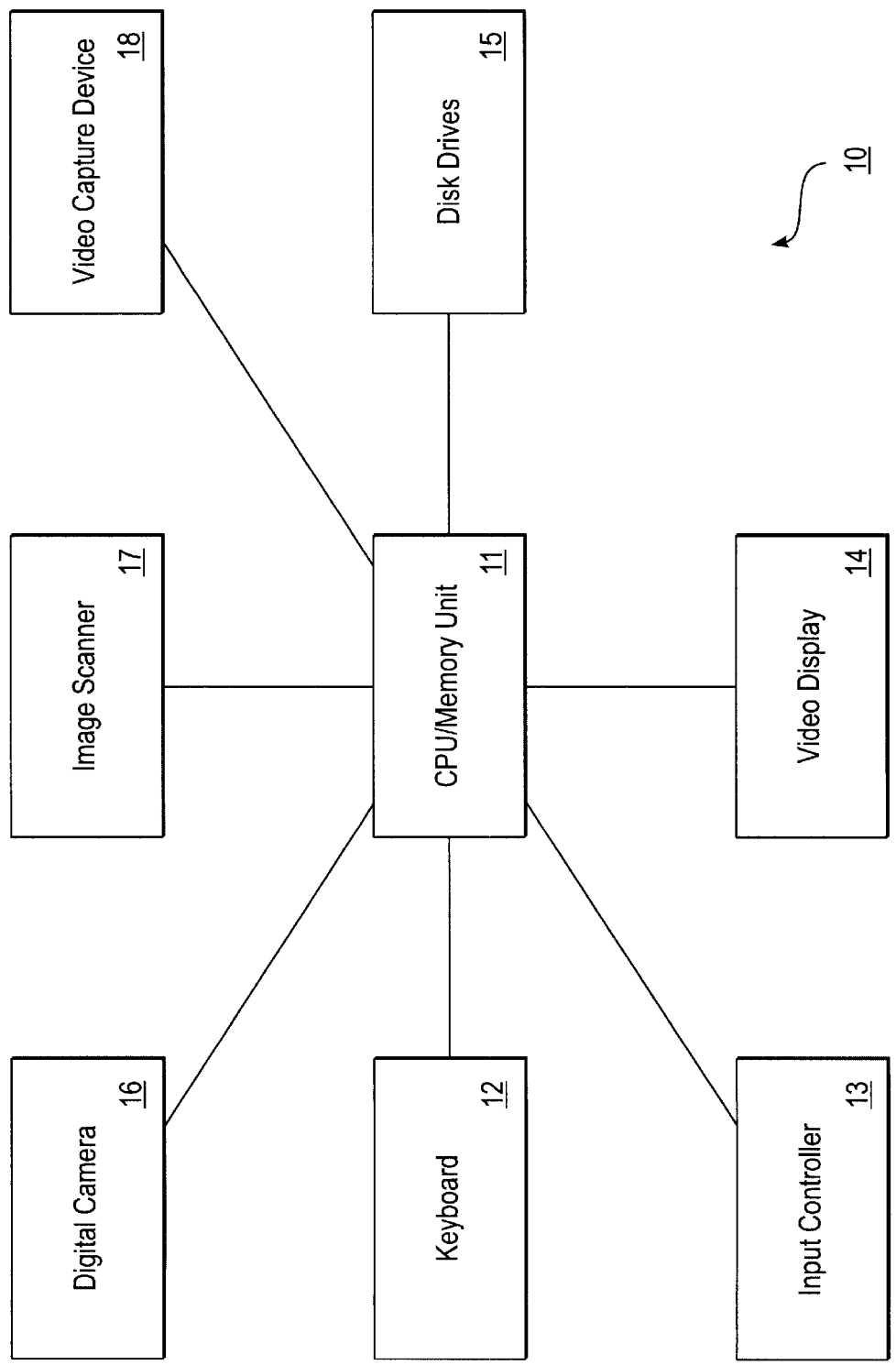
FIG. 1 depicts a generalized block diagram of a computer system as might be used by the present invention.

FIG. 1 is a generalized block diagram of a computer system 10 which includes a central processing unit (CPU)

11. CPU 11 generally includes one or more general purpose processors and one or more memory units, usually in the form of read/write memory (RAM) and/or read only memory (ROM). Application programs, for example a three-dimensional modeling program which makes use of the techniques of the present invention, may be loaded into RAM (e.g., from another storage medium) for execution by one or more of the general purpose processors which comprise CPU 11. In other cases, computer readable instructions which comprise an embodiment of the present invention may be stored in ROM or other non-volatile media, or downloaded from a source of such instructions (e.g., via a computer network and/or the network of networks commonly referred to as the Internet) for execution by CPU 11. Moreover, the memory elements (e.g., RAM) of CPU 11 may be used as temporary storage locations for the various images, v-channels and working buffers described below.

Computer system 10 also includes a keyboard or other alphanumeric input device 12 which is coupled to (e.g., via one or more busses) and provides user input to CPU 11 as does a two-dimensional input controller 13. Two-dimensional input controller 13 may, by way of example, be a mouse, trackball, stylus or other input device. Images may be provided to CPU 11 via image scanning device 17, video capture device 18 (e.g., which is able to extract still images from a video signal) and/or digital camera 16, each or any of which may be coupled to CPU 11 via one or more connectors and/or busses.

Disk drive unit(s) 15 (or other long term storage media) may also coupled to CPU 11 and may be used for storing the digital images and geometric and texture data for three-dimensional models as well as computer readable instructions which comprise an embodiment of the present invention. Display output is provided by a video display unit 14 coupled to CPU 11. Video display unit 14 may be a conventional display such as a liquid crystal display (LCD) or other display device.

Digital images can be created by scanning existing photographs or printed material into the computer system 10 and storing same in memory or on disk drive 15. This may be accomplished, for example, using a software application which, when executed by CPU 11, allows still images to be captured from a video (e.g., as a frame of the video) and stored to memory. Alternatively, the output of digital camera 16 or scanner 17 may be downloaded to memory and/or long term storage. In this way, one or more digital images may be stored and later used by a software application which employs the techniques of the present invention.

Figure 2:
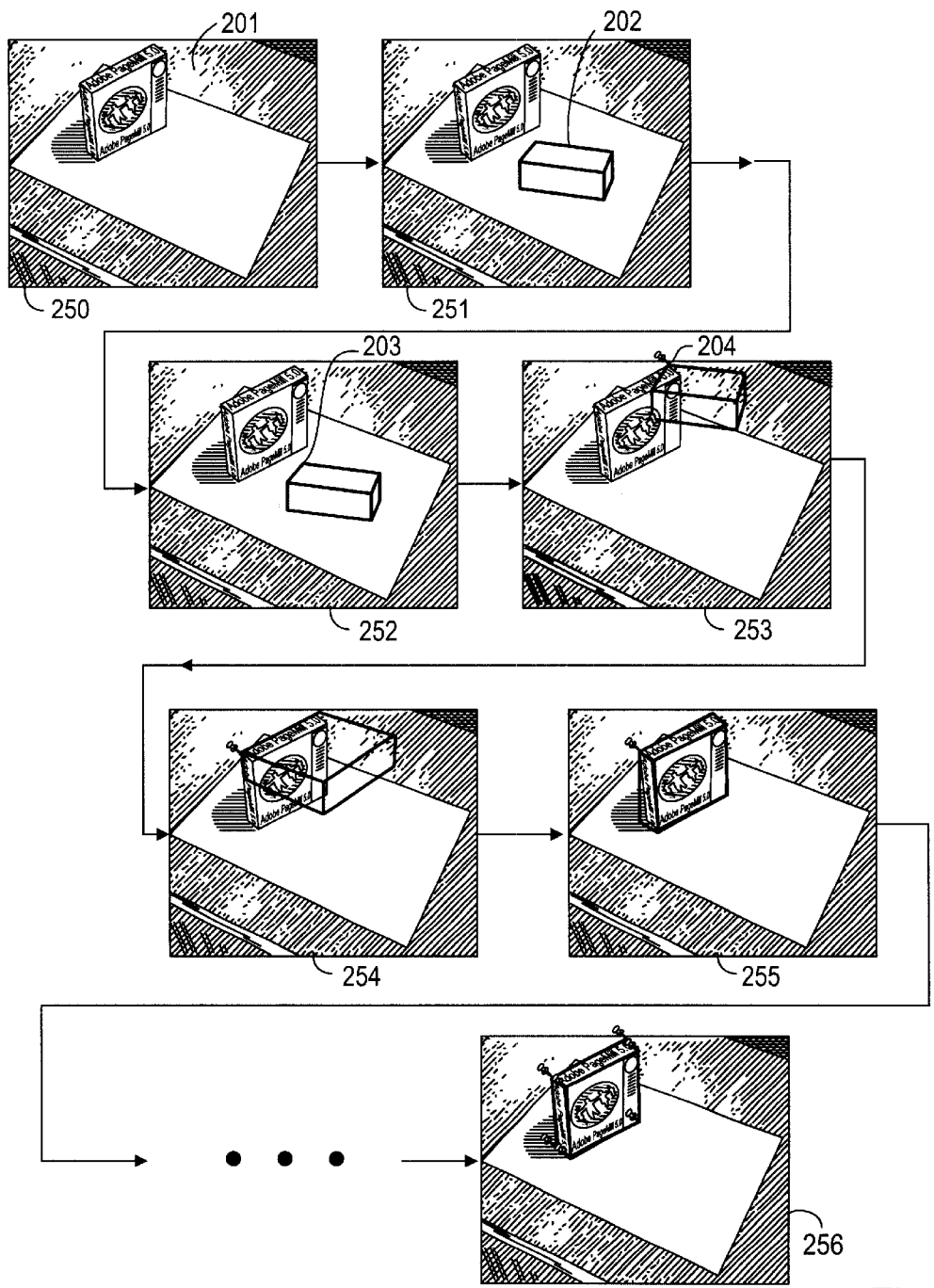
FIG. 2 illustrates a user-supplied image overlaid with a wireframe of a primitive and constraints.

FIG. 2 now illustrates a general method of creating a digital model which makes use of the methods of the present invention. Having loaded a digital image 201 (step 250), a user may then create one or more objects known as primitives (e.g., boxes, pyramids, cylinders, or other three-dimensional objects) which approximate the objects shown in the digital images (step 251). A wireframe rendering 202 of the primitives may be displayed over top of the digital image 201 (i.e., the digital representation of the photograph). The objective then, is for the user to manipulate the wireframe primitive rendering 202 using the methods of the present invention, until the wireframe precisely (or nearly precisely) coincides with the object it represents in the digital image (steps 252, 253, 254, 255 and 256). Thus, the user creates a geometric model (from the primitive(s)) right on top of the digital image 201 (i.e., the photograph(s)), without requiring the use of separate editors, windows or views. In the example shown in FIG. 2, a wireframe rendering 202 of a rectilinear box is manipulated until it coincides with the outline of a box shown in the digital image 201.

The two-dimensional wireframe rendering 202 of the primitive may be created from its predefined three-dimensional representation by projecting the geometry of the primitive through a virtual camera. Parameters for the virtual camera, such as position, orientation, focal length, etc., are found (e.g., as the wireframe primitive representation 202 is aligned with the object it represents in the digital image 201) such that projection through the virtual camera yields the same two-dimensional projected geometry as is visible in the underlaid digital image (i.e., the underlaid photograph) 201. If more than one digital image (photograph) 201 is provided, then multiple virtual cameras (e.g., one for each image) may be created and the corresponding camera parameters estimated therefore. At the same time, parameters for each of the primitives (e.g., length, width, height, orientation and location in space) overlaid on the digital image are determined.

Figure 3:
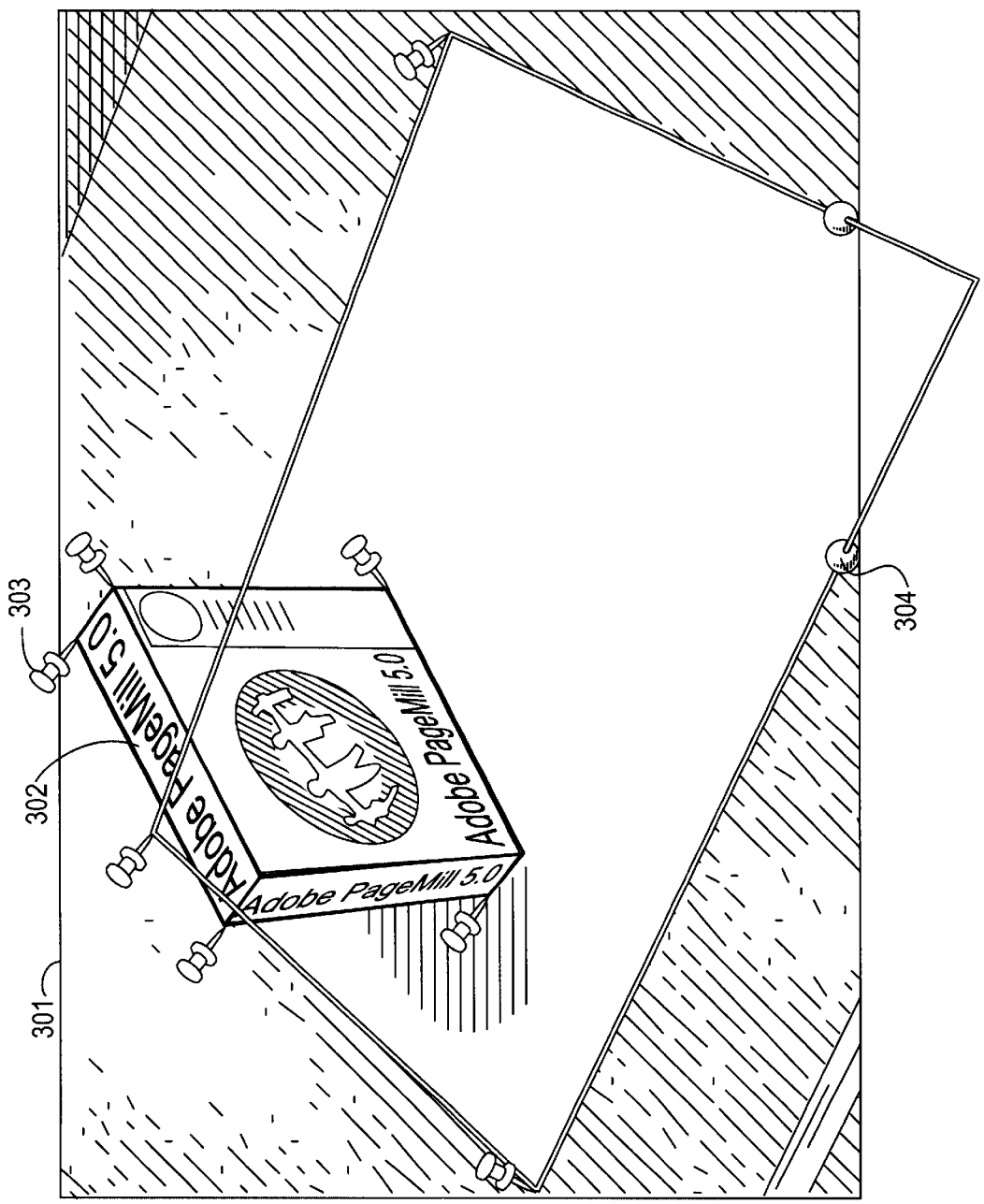
FIG. 3 illustrates the use of constraints to align wireframe representations of primitives to objects in a digital image in accordance with the present invention.

To accomplish these objectives, as the user manipulates the wireframe renderings 202 of the primitives to align the wireframe with the underlaid image 201, constraints are added to "fix" the wireframe 202 to the image 201. For example, as shown in FIG. 3, constraints 303, 304 which constrain or fix the location of corners or edges of the wireframe projections 302 to the locations in the image 301 to which they correspond or to constrain geometrical relationships between the primitives in their three-dimensional representations are added. As the constraints are introduced into the model, new estimates for all parameters of the primitives and virtual camera(s) are calculated. Based on these new parameters, the geometric coordinates of each primitive can be calculated and projected through each virtual camera to yield an updated projected wireframe graphical representation overlaid on the image and displayed to the user. The present inventions minimizes the amount of change in parameters which, with frequent enough incremental re-evaluations and reprojections yield a smooth movement of the wireframe, thus providing the user with the illusion of manipulating real three-dimensional objects made of springs or an elastic-like material. Further details regarding the various types of constraints which may be used to fix the wireframe projection to the image may be found in co-pending application Ser. No. 09/062512.

Thus, in the present invention virtual camera and primitive parameters are estimated simultaneously. Even at the point of creation of the first primitive, and at all times thereafter, a current estimate for all the camera and object parameters exists. As the user provides additional information in the form of constraints or additional images, these parameters get updated and more precise, but they are always available. Initially, the parameters are set to a default value, but typically converge to "correct" values after only very little additional user input (e.g., as the projected wireframes are manipulated to correspond to the objects depicted in the underlaid digital image).

Figure 5:
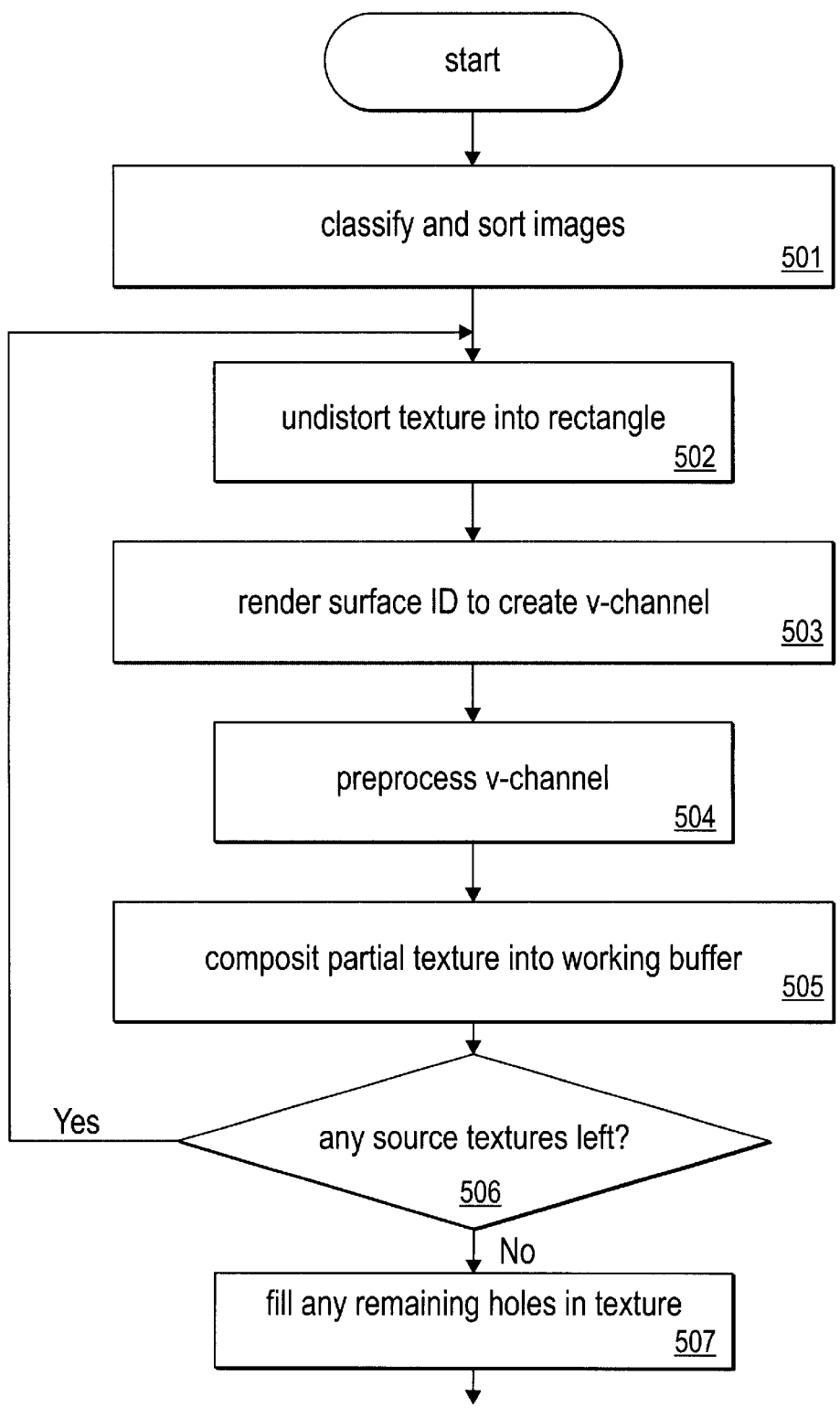
FIG. 5 is a flowchart illustrating the sequence of steps involved in mapping a texture onto a computer-generated model of a scene according to one embodiment of the present invention.

Once a three-dimensional model of the scene in question, along with the virtual cameras (with orientation, position and focal length parameters amongst others) for each source image, is available, the texture mapping process may be initiated. FIG. 5 illustrates this procedure.

First, at step 501, an image classification and sorting procedure is performed. During this procedure, a metric is created for each surface in each image. This will be a measure of "goodness" of a particular source image for a corresponding surface. The source images are then sorted in order of goodness and composited as described further in steps below. The per-image metric consists of several components including (a) resolution, i.e., how many pixels are available for that surface from an image; (b) validity, i.e., as a percentage, how many of these pixels are actually valid as per v-channel; (c) obliqueness, i.e., the angle at which the surface is seen in an image (very oblique projections cause severely distorted pixels and, thus, in one embodiment such images are ranked as less good than others which include less oblique views of the surface of interest); and (d) off-centeredness, which measures how far a surface is away from the center of an image. The classification and sorting procedure is to promote surfaces at the center of images since they are more likely what the user tried to capture in a particular photograph or image. Also, with flash photography, surfaces directly in front of the camera will typically be better illuminated than surfaces at the image periphery.

These separate measures are then combined to form a single valued metric for a surface for each image. In the preferred embodiment, unit interval valued obliqueness and off-centeredness are multiplied into validity. Images are then sorted according to validity, except that when validity differs only by a prescribed amount, e.g., approximately 10% for one embodiment, the higher resolution image is preferred. The result of this classification procedure is that the textures with greatest coverage will be chosen first. These have the fewest missing pixels, which would need to be filled in with other partial textures or by a hole-filling method, either of which can produce visual artifacts. Hence, this method is called MINSEAMS because it minimizes the number of source textures and hence the number of seams between them in the final texture image.

Figure 4:
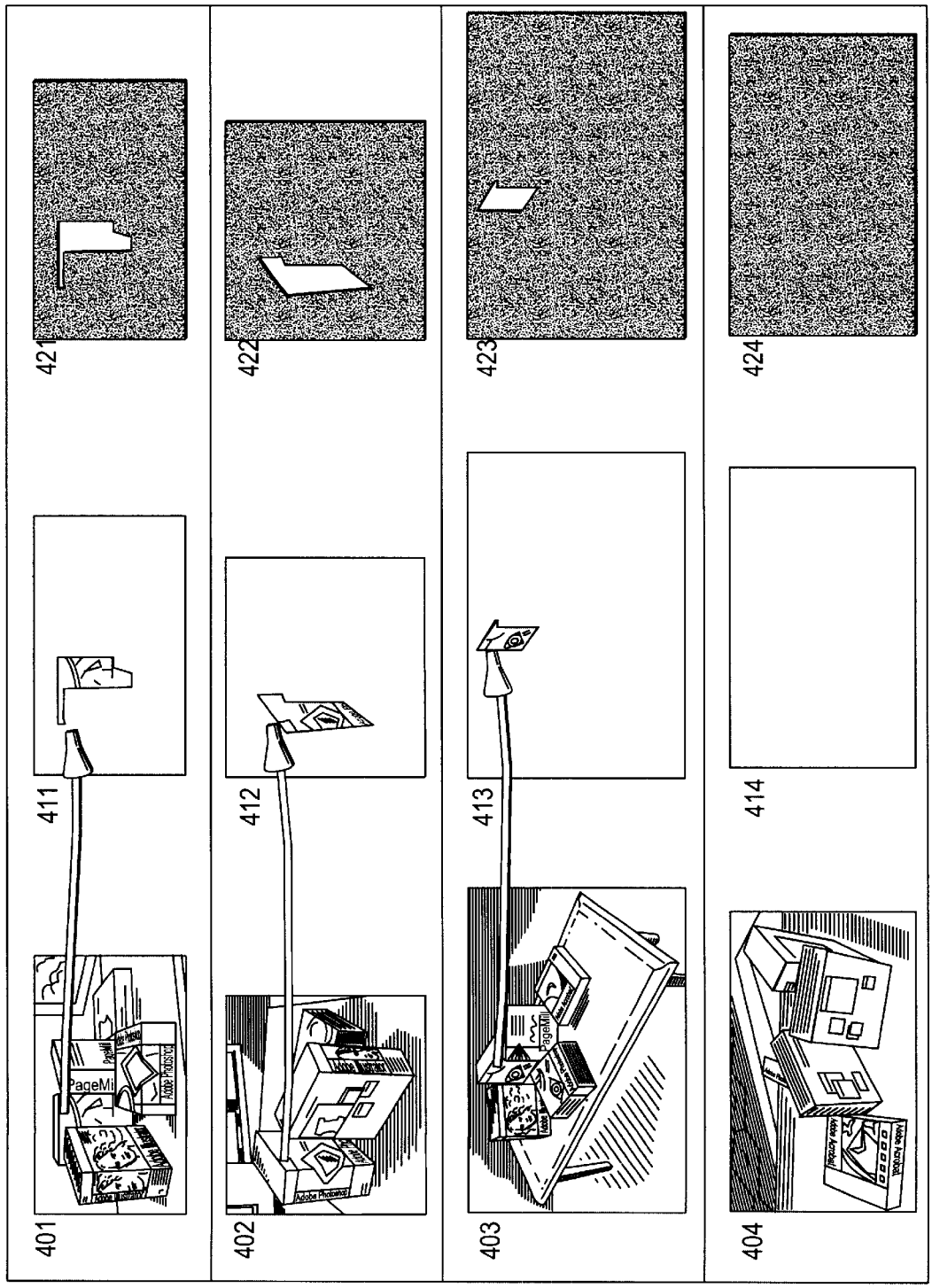
FIG. 4 illustrates source images from which textures may be extracted according to one embodiment of the present invention along with the corresponding v-channel masks for the images.

FIG. 4 graphically illustrates the result of this classification and sorting process. In the diagram images 401, 402, 403 and 404 correspond to a set of source images from which a final texture image for an object in a three-dimensional model will be extracted. For illustration purposes, in FIGS. 4, 7 and 8 (below), the entire mapping process (as described by the flow diagram of FIG. 5) will be shown for one object's (in this case a rectilinear box which has been produced according to the above-described procedures to represent the box shown in the images—note, the box itself is not shown so as not to unnecessarily complicate the drawing) front surface. Illustrations 411, 412, 413 and 414 show that portion of each of the source images 401, 402, 403 and 404, that correspond to the surface of the box in question. Notice that source image 404 does not show the front surface of the box of interest at all and, therefore, no relevant source pixels can be extracted from it (this is a common situation where multiple images of a scene are used). Illustrations 421, 422, 423 and 424 show the corresponding (still distorted) v-channel masks. These masks are shown for illustration purposes only as the present method actually builds the v-channel only for the undistorted textures. However, it is hoped that these illustrations will aid in understanding the methods of the present invention.

The four source images 401, 402, 403 and 404 have been sorted according to the "goodness" parameter, as determined by the classify and sort images step 501 in FIG. 5. That is, the sorting procedure has determined that source image 401 is the most usable source image (e.g., perhaps because it is the least distorted by its projection), 402 the next most usable, and so on. Source image 404 is the least usable image because it has no relevant pixels at all.

In the event that none of the source images (e.g., 401, 402, 403 and 404) was able to provide a significant amount of coverage for the surface of interest, a different method for selecting which source images to use can be employed. This optional procedure (which may be implemented as an optional path within step 501) favors source image resolution over valid coverage, and does so on a pixel-by-pixel basis. Highly obscured surfaces such as floors or distant surfaces typically receive only a small percentage of pixels from each image in the final textured model. Thus, it is highly likely that there will be a number of seams in the final image that are necessary anyway. Therefore, it is logical to choose the highest resolution source image available for these surfaces.

Figure 6:
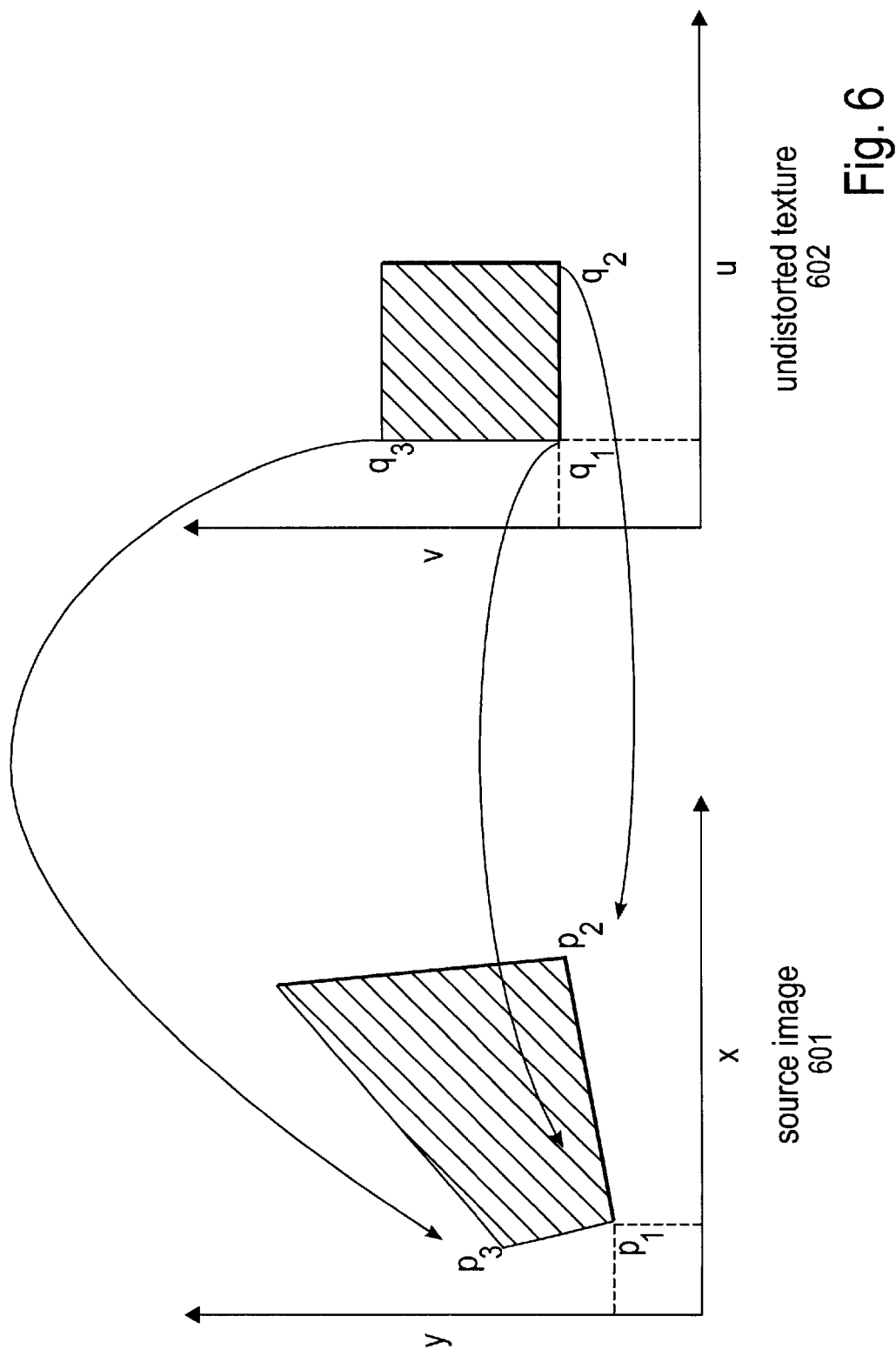
FIG. 6 graphically illustrates the transformation from distorted texture pixels to undistorted texture pixels as performed by one embodiment of the present invention.

Referring to FIG. 6, the amount of area corresponding to a unit pixel (1×1) in undistorted texture space (602) can be calculated in source image space (601) as follows:

$$q_1 = (u,v,1);$$

$$q_2 = (u+1,v,1);$$

$$q_3 = (u,v+1,1);$$

$$p_i = q_i \cdot M/(q_i \cdot M)I_z,$$

for i=1,2,3;

$$\text{area} = (p_2 - p_1) \times (p_3 - p_1),$$

where M is the 3×3 perspective texture transformation matrix, "·" denotes a multiplication of a two-dimensional homogenous vector with a 3×3 matrix, "$I_z$" denotes just the z-component of a vector, and "X" denotes a vector cross product. It is possible to establish a measure, per pixel in the undistorted image, of how much area this represents in the distorted (source) image (e.g., 401, 402, 403, 404). Higher values translate to better information for the surface of interest. This information can then be combined with the v-channel created by the present method (see step 504 described below) by masking out all pixel scale information for which the v-channel is zero (i.e. the pixel is invalid). Then, for each pixel, a winning (i.e., highest resolution) source image is found. The v-channel for that image at that pixel stays unchanged. The v-channel for all other images at that pixel is set to zero. The resulting v-channels can then be used in the merge step 505 described below. Because the scale function which defines pixel scale is a smooth linear function (e.g., where flat polygons are used for the surfaces in the synthethic model of the scene), the resulting maximum will have smooth linear intersections. Note, in other embodiments, polygons having non-flat (e.g., round) surfaces, such as cylinders, spheres, etc., may be used. In such cases, the techniques of the present method are still applicable, however, the scale function, although still smooth, would not be linear. Hence, the resulting maxima will have smooth intersections, but they will not be linear.

Figure 7:
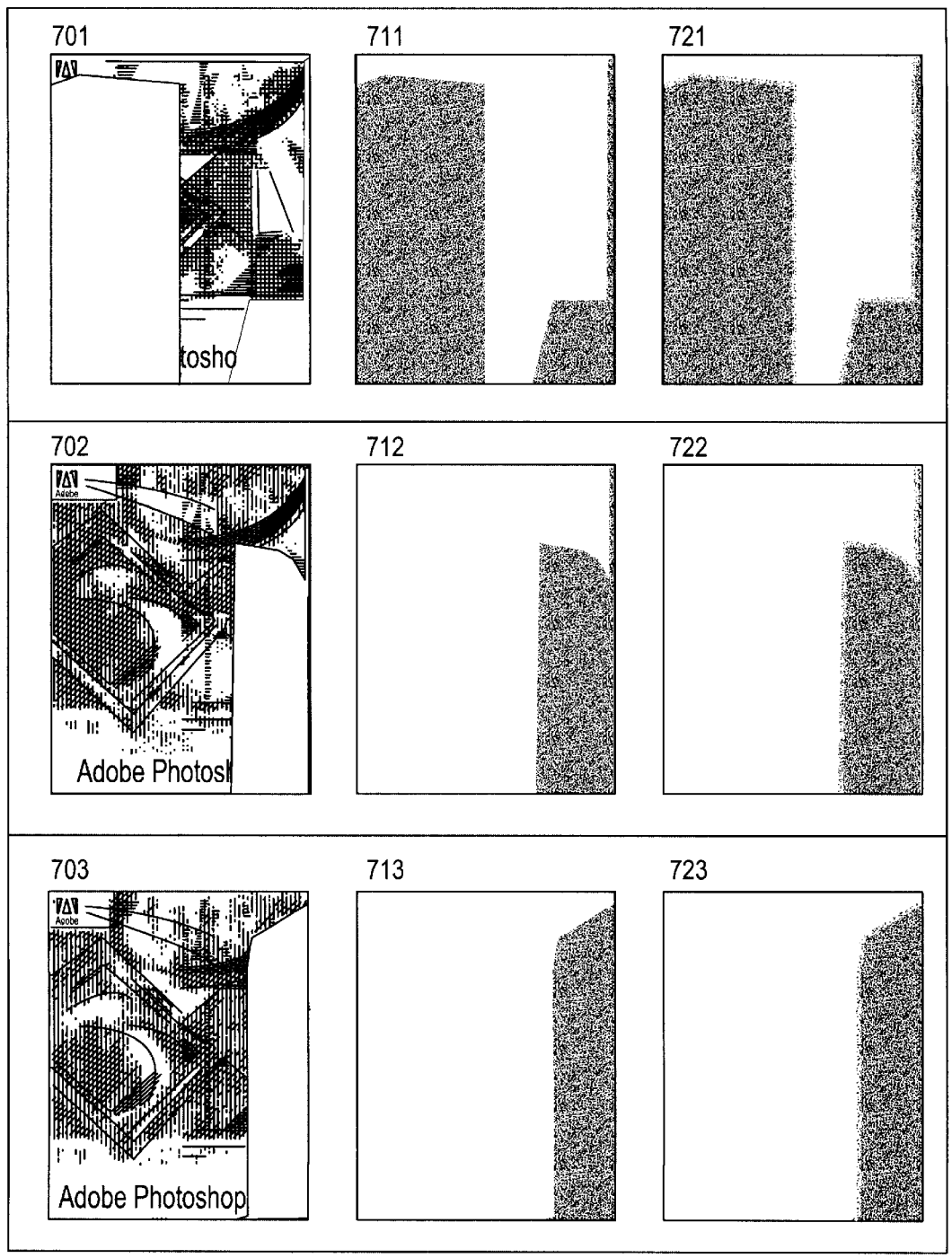
FIG. 7 illustrates the results of texture processing steps according to various embodiments of the present invention.

Once the source images have been sorted according to one of the above procedures, the perspective distortions in the images is accounted for at step 502. Because the source images, e.g., 401, 402, 403 and 404, contain perspective distortion, each perspectively projected source surface has to be undistorted. For example, a rectangle in three dimensions would project to a general quadrilateral in a perspective projection. To undo the distortion, this step would map the quadrilateral back into an undistorted rectangle. As is widely known in the art, this can be accomplished with a 3×3 transformation matrix. See, e.g., Paul Heckbert, "Fundamentals of Texture Mapping and Image Warping", *University of California Berkeley Technical Report UCB-CSD 89–516*, June 1989. To maximally preserve image information, the highest resolution in each of the parametric directions u and v is used for the rectangular texture receiving the undistorted pixels. In one embodiment, interpolation filtering is used while undistorting the source pixels to reduce visual artifacts. The result of this "undistort step" is illustrated in FIG. 7. In the diagram, each row of images (i.e., each set of illustrations 7x1, 7x2 and 7x3, x=0–2) corresponds to the processing steps applied to a single source image. Image 701 corresponds to the relevant source pixels from source image 401, image 702 corresponds to the relevant source pixels from source image 402 and image 703 corresponds to the relevant source pixels from source image 403. Note that source image 404 contributed no relevant texture pixels for the surface of interest and so is not further processed.

The set of images 701, 702 and 703 corresponds to the result of applying step 502 (i.e., the "undistort step") to each of the source images 401, 402 and 403 in FIG. 4, respectively. Areas where the source image did not provide any relevant pixels for the surface of interest (e.g., because the surface was obscured by a nearer surface or because that part of the surface was outside of the image bounds, etc.) are left black (where black indicates a v-channel value of zero, i.e., indicating that no pixel or color information is available). The other areas receive the undistorted pixels from the source image.

Next, at step 503 of FIG. 5, for each image, and for each surface in that image, a determination is made as to whether a particular pixel (image element) is a visible part of that surface. Such a determination is required because, for example, some pixels may be obscured by other, closer surfaces or a part or all of the surface may lie outside the image, making those pixels invalid for texturing. The validity mask produced by this decision-making process is undistorted (e.g., using the same transformation as was used above in the "undistort step") into a rectangular image with the same pixel resolution as that used for the color information in the "undistort step" 502. This validity information, optionally interpolation filtered (resulting in partially valid pixels) is then stored as a v-channel (analogous to an alpha or a-channel encoding transparency commonly used in image processing).

FIG. 7 illustrates this process graphically. Images 711, 712 and 713 correspond to the output of the process of step 503. That is, each of the images 701, 702 and 703 are rendered to create the v-channel masks 711, 712 and 713, respectively. The masks are left white where there are available texture pixels (e.g., from the images 701, 702 and 703), and are black in any remaining areas.

One the v-channel masks have been created, the preprocessing of the v-channels, step 504 of FIG. 5, can be performed. Because the photogrammetric method used to find the three-dimensional model and virtual camera parameters is not exact (see co-pending application Ser. No. 09/076366 for a detailed explanation as to why this is the case), the projected boundaries of the surfaces may not register exactly with the corresponding images. To avoid bleeding of color information from projectively adjacent surfaces, the v-channel is preprocessed to additionally exclude pixels close to boundaries. A similar operation in morphological image processing is called erosion.

In the present invention, rather than using a binary bitmap, the v-channel is eroded by a continues ramp, with values between 1 (close to the valid interior regions) and 0 (close to the invalid exterior regions). In a later step, such a v-channel ramp will cause the color values at the corresponding pixels to be smoothly blended, thus reducing visible seams between textures coming from different source images. A straightforward extension to the construction of the v-channel is to allow a user to paint over regions of source images that are not to be used for the texture fusion process, perhaps because they contain information for objects present in the real world but not modeled in the three-dimensional scene and thus erroneously projected onto a surface. Examples are trees, lampposts, birds, cars present in one image but not another, etc. The user defined mask is simply logically ANDed with the surface id mask from step 502 before undistorting into the v-channel.

In FIG. 7, images 721, 722 and 723 correspond to the output of step 504. Boundaries of the v-channel have been eroded and a smooth ramping function applied so that transitions between white (available pixels from the source image) and black (no available pixels from the source image) regions of the v-channel mask now contain gray values, signifying "somewhat available pixels".

Next, at step 505 of the flow diagram shown in FIG. 5, the sorted source textures and v-channels may be merged or fused to form a composite. At this point, a number of source textures are available in an undistorted form. Red, green, blue (i.e., color) and v-channel information is available for each. The v-channel provides a pixel validity level between 0 and 1. Although not necessary, all source textures for a particular surface are preferably available at the same pixel resolution. The task is now to combine all existing texture information from the multiple images into a single texture.

For a fast preview of the final texture, one can simply use the best (as determined in step 501) source image, and copy its color and v-channel values into a working buffer of the same size. Then, for each subsequent available source texture, copy into the working buffer only those color and v-channel values for which the pre-existing v-channel value is still zero. As indicated above, a zero v-channel value indicates that no pixel (color) information is available for the corresponding pixel. Non-zero v-channel values indicate that at least some pixel information is available and a v-channel value of "1" indicates that complete pixel (or color) information is available for the corresponding pixel. Eventually all source images will be used.

In one embodiment, this compositing step may be exited early if it is detected that no more zero-value v-channels are present (i.e., the composite texture is fully covered with valid pixels). If at the end of this step any zero-value v-channel pixels remain, a hole filling procedure, e.g., as described below, may be employed.

A higher quality alternative to the above "fast" method is to merge source textures using blending rules and v-channel values as weight. Stated simply, the resulting color value per pixel is:

$$rgb = (rgb_w * v_w + rgb_n * v_n)/(v_w + v_n)$$

where $rgb_w$ and $rgb_n$ are the color values (red-green-blue) for the working buffer and $n^{th}$ source image, respectively and, likewise, $v_w$ and $v_n$ are the v-channel values for the working buffer and $n^{th}$ source image, respectively.

In one embodiment, this merging is done at a variety of image frequencies using a pyramid scheme, as is well known in the art (see, e.g., J. Ogden et al., "Pyramid Based Computer Graphics", *RCA Engineer*, pp. 30–35, September/October 1985), modified slightly to take v-channel information into account, but other blending schemes can of course be employed. For very low frequency components of the image, this compensates for hue and luminosity variations in the different source textures, as a blended aggregate value is propagated across both source textures. At higher frequencies, the merging provides smooth blending between seams, additionally aided by the smoothly ramping transitions of v-channel values produced by the erosion in step 504.

Figure 8:
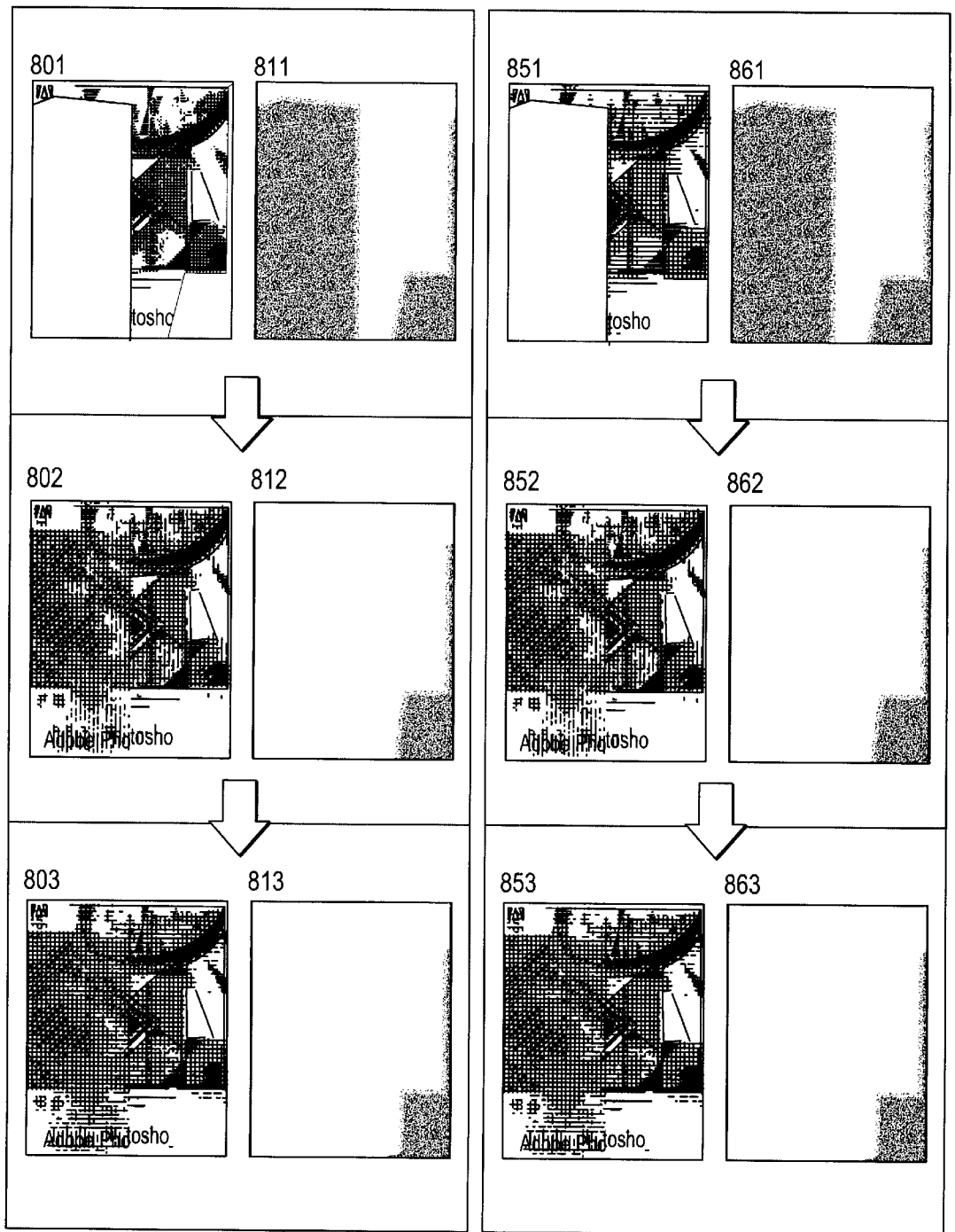
FIG. 8 illustrates various processes of compositing textures in accordance with various embodiments of the present invention.

FIG. 8 illustrates the two compositing procedures described above. The "fast" method is illustrated graphically in sequence 800 while the high-quality method corresponds to sequence 850. In both the fast and high-quality alternatives 800 and 850, the process starts by initializing the rgb (color) and v-channel buffers to the contents of the best available source texture. In the illustrated case, that corresponds to rgb texture 701 and preprocessed v-channel 721 of source image 401. These are illustrated as images 801 and 811, respectively, for procedure 800 and images 851 and 861, respectively, for procedure 850.

The first compositing step merges rgb (color) texture 702 (the next best texture from the next best source image) with its corresponding preprocessed v-channel 722 into the current working buffer. This fills in a large missing area of texture on the left side of the surface texture image. The resulting working buffer after this compositing step is shown in image 802 (with corresponding v-channel information 812) for the fast method and in image 862 (with corresponding v-channel information 862) for the high-quality method.

Now, another compositing step using the next best available image information (from source image 403) is performed. This time, rgb texture 703, with corresponding preprocessed v-channel 723) is composited into the current working buffer. This fills in a small triangular area in the bottom center of the surface image texture. The resulting working buffer entry after this second compositing step is shown in image 803 (with corresponding v-channel information 813) for the fast method and in image 853 (with corresponding v-channel information 863) for the high-quality method.

As there are no further source images to obtain information from (see step 506 and recall that source image 404 contributed no pixels to the surface texture image of interest), a hole filling process may be needed to complete the surface texture image. The hole filling step (step 507 in FIG. 5) may be a separate post-processing step (as shown) or it may be included as part of the compositing process (step 505). In either case, the hole filling process may be needed because even after all available source image textures have been merged, there may still be areas in the final texture image for which there is no source information at all—i.e., the v-channel values for these pixels will be zero. Image 803 of FIG. 8 illustrates this point. Notice that the lower right corner of the texture image remains incomplete and it will have to be filled in before the texture image is applied to the box surface in the model.

If the higher-quality alternative compositing method with modified pyramid blending was used in step 505, then as shown in image 853 of FIG. 8, the holes will already be filled with an extrapolated version of the surrounding valid image. Locally, these will provide a continuous extension to valid images, and across wider distances, the color will tend towards the "average" of the final texture nearest to the hole boundary. Other hole-filling processes can be used, but care should be taken to preserve both color and frequency components across the hole-valid area boundary. Examples of hole filling methods are simple dilation algorithms known from image processing, sampling, or more sophisticated texture synthesis methods, e.g., as described in "Multiresolution Sampling Procedure for Analysis and Synthesis of Texture Images", by Jeremy Bonet, *Computer Graphics Proceedings, SIGGRAPH* 1997, pp. 361–368 (1997).

In addition to providing these improved texture images, the present invention may also provide capabilities for extracting diffuse lighting information (radiosity) from source images. To illustrate, consider that the human visual system is very sensitive to even slight variations in illumination as a cue to depth and spatial structure. In computer graphics, a well known technique known as "radiosity solution" emulates the way light bounces or reflects between surfaces to generate subtle shading variations that give a synthetic image added realism. In the context of the present invention, the radiosity solution has already been computed (i.e., in the source photographs of the real world scene) and, hence, is captured in the source images (e.g., 401, 402, 403 and 404). For viewing angle independent illumination effects (diffuse lighting) these variations in lighting will be the same for all images. It is possible to extract the effect of the lighting by taking a low-pass filtered version of the composite texture, produced as the output of step 507, transforming the pixels from RGB (red-green-blue) to luminosity color space (e.g., using techniques well known in the art), and for each pixel, recording the deviation of that pixel's luminosity from the average luminosity for the whole texture image.

This diffuse illumination information can then be employed further in two ways: First, if one wishes to synthetically re-light the scene with different lights (e.g., using standard computer graphics techniques well known by those of ordinary skill in the art) one first eliminates preexisting "real" light by modifying each pixel in the texture image to bring it up to average luminosity. Second, in case an entirely different, synthetic texture is applied to a surface, standard flat, diffuse or Gouroud shaded rendering methods may be used to produce unrealistically evenly lit images. Rather than apply expensive radiosity solution methods then, the present invention allows the luminosity information from the real world image to be applied to the synthetic texture image as an approximation to the radiosity solution.

In addition, the present invention provides for extracting and eliminating specular lighting effects. Specular lighting effects are view angle dependent phenomena that are most visible on highly reflective surfaces, at oblique angles. Because the present method achieves the goal of generating a composite, view-independent texture image, it can be used to eliminate artifacts from specular lighting that were present in the original photographs and which only make visual sense from that particular photograph's viewing direction.

The context in which the present invention is disclosed is a photogrammetric modeling system which provides parameters for a variety of objects in a three-dimensional model and virtual cameras. As a straightforward extension, the position and direction of light sources can be found by such a system by allowing the user to point out the center and shape of projected highlights on a surface. In addition, shadows cast by objects can similarly be used. Using standard Phong or similar shading techniques, a simulation of the light's effect on a particular surface can then be calculated. Then, the model light's luminosity may be subtracted from the measured texture image luminosity, leaving an essentially "unlit" surface, i.e., one which has specular illumination artifacts factored out. This resulting texture image can then be re-illuminated with synthetic lights at different angles and positions using standard computer graphics techniques well known by those of ordinary skill in the art.

Further, the present invention may automatically removing view-dependent obstructions from the final texture image, even if such obstructions were present in some of the source images. As mentioned above, in conventional texture mapping processes, user supplied masks may be employed to paint out undesired areas of an image, such as trees projected onto house walls, moving cars present in one image but not the next, lamp posts, etc. This can be labor intensive. However, with the methods of the present invention, if enough source images are available for a particular surface such obstructions may be automatically removed.

For example, after the texture unwarping process (step 502 of FIG. 5), both color and v-channel values are available for each source image for a particular surface. Because the perspective distortion has already been undone, corresponding pixels can be compared directly to one another. If a statistically significant outlier in color is detected between corresponding valid (v-channel>0) pixels, then that pixel can be assumed to come from a view-dependent obstruction. Therefore, its v-channel value is either reduced or set to zero. Of course, because of potentially unmodeled depth relief on surfaces, the assumption that same real surface location is actually registered at the same pixel in all the source images may not hold exactly. Therefore, view-dependent obstructions may be removed in low-pass filtered versions of the source images.

Thus, an improved computer-assisted technique for creating and/or utilizing merged, view-independent textures from multiple views, e.g., for application in interactive computer-assisted modeling environments, has been described. Although the foregoing description was set forth with reference to certain illustrated embodiments, it should be appreciated that the present invention is in no way limited to these examples. For example, the above discussion has shown that the present invention provides a method which allows fusing information extracted from two or more images of a scene into a single texture image for each surface of a computer-generated model of the scene. The process provides standard, view-independent rectangular textures over standard geometry as outputs, which may allow the method to be used by a wide variety of existing hardware and software computer graphics display systems. The fusion of the texture information results in the "best" available source information from each image being used, where "best" usually means highest resolution, but, as indicated above, different measures can also be used. Accordingly, the present invention should not be restricted by the foregoing discussion and should only be measured in terms of the claims which follow.

What is claimed is:

1. A computer-assisted method, comprising:
    sorting, according to a metric, two or more images of a scene; and
    fusing information extracted from the two or more images of the scene into a texture image for a surface of a three dimensional computer-generated model of the scene,
    wherein the metric is a measure of goodness of each image for a corresponding surface of the three dimensional computer-generated model and is computed by multiplying unit interval valued obliqueness and off-centeredness for each image into validity.

2. The computer-assisted method of claim 1 wherein the fusing of information extracted from two or more images provides a view-independent rectangular texture image.

3. The computer-assisted method of claim 1 wherein the two or more images each include different views of the scene.

4. The computer-assisted method of claim 1 wherein the two or more images each are taken with different cameras.

5. The computer-assisted method of claim 1 wherein the two or more images show the scene under different lighting conditions.

6. The computer-assisted method of claim 1 wherein the fusing of information extracted from two or more images makes use of the best available source information from each image.

7. The computer-assisted method of claim 6 wherein the best available source information from each image means the highest resolution image available.

8. The computer-assisted method of claim 1 wherein the metric is established on the basis of one or more components chosen from the list comprising: resolution and validity.

9. The computer-assisted method of claim 1 wherein the images are sorted according to validity.

10. The computer-assisted method of claim 1 wherein if validity of the images differs by a prescribed amount, the images are sorted by resolution and not validity.

11. The computer-assisted method of claim 10 wherein the prescribed amount is approximately 10%.

12. The computer-assisted method of claim 1 wherein the images are further sorted according to image resolution.

13. The computer-assisted method of claim 12 wherein the image resolution is measured on a pixel-by-pixel basis.

14. The computer-assisted method of claim 1 further comprising accounting for perspective distortions in the images after the sorting of the images.

15. The computer-assisted method of claim 14 wherein interpolation filtering is used while accounting for perspective distortions in the images to reduce visual artifacts.

16. The computer-assisted method of claim 14 further comprising determining, for each of the images and for each surface in each of the respective images, whether a particular pixel is a visible part of each respective surface, after accounting for perspective distortions in the images.

17. The computer-assisted method of claim 16 further comprising producing, from the determination as to whether a particular pixel is a visible part of each respective surface, a validity mask for each image.

18. The computer-assisted method of claim 17 further comprising undistorting the validity mask for each image.

19. The computer-assisted method of claim 17 further comprising interpolation filtering the validity mask for each image.

20. The computer-assisted method of claim 18 further comprising storing the validity mask for each image as one or more v-channels.

21. The computer-assisted method of claim 20 further comprising eroding the v-channels to exclude pixels on boundaries of the images.

22. The computer-assisted method of claim 21 wherein the v-channels are eroded using a continuous ramp.

23. The computer-assisted method of claim 21 wherein the fusing comprises copying color and v-channel information of a best one of the images into a working buffer and, for each of the remaining images, copy into the working buffer that color and v-channel information associated therewith for which the v-channel information in the working buffer is non-zero.

24. The computer-assisted method of claim 21 wherein the fusing comprises blending color information from the images according to v-channel information for the images.

25. The computer-assisted method of claim 24 wherein the blending is performed at a variety of image frequencies.

26. The computer-assisted method of claim 23 further comprising filling any remaining holes in the texture image after the fusing.

27. A computer-assisted method of extracting diffuse lighting information from one or more source images of a scene comprising recording for each pixel in a composite texture image for a surface of a three-dimensional model produced by fusing information extracted from two or more of the images the deviation of the pixel's luminosity from the average luminosity for the entire texture image, wherein prior to such fusing the source images are sorted according to a metric that is a measure of goodness of each image for a corresponding surface of the three-dimensional dimensional model and is computed by multiplying unit interval valued obliqueness and off-centeredness for each source image into validity.

28. The method of claim 27 wherein the composite texture image is low pass filtered prior to the recording.

29. The method of claim 27 wherein prior to the recording, the pixels of the composite texture image are transformed into luminosity color space.

30. The method of claim 27 further comprising synthetically relighting the model by modifying each pixel in the composite texture image to reflect the average luminosity.

31. A computer-assisted method of extracting specular lighting effects from one or more source images of a scene comprising subtracting, for a composite texture image for a surface of a three-dimensional model produced by fusing information extracted from two or more of the images, the model light's luminosity from a measured luminosity of the composite texture image, wherein prior to such fusing the images are sorted according to a metric that is computed by multiplying unit interval valued obliqueness and off-centeredness for each image into validity.

32. The method of claim 31 further comprising re-illuminating the surface with synthetic lights.

* * * * *